US010636270B2

(12) United States Patent
Irukayama et al.

(10) Patent No.: US 10,636,270 B2
(45) Date of Patent: Apr. 28, 2020

(54) CONTROL SYSTEM

(71) Applicant: SOUNDPOWER CORPORATION, Fujisawa-Shi, Kanagawa (JP)

(72) Inventors: Godo Irukayama, Koto-ku (JP); Kohei Hayamizu, Mitaka (JP)

(73) Assignee: SOUNDPOWER CORPORATION, Fujisawa-Shi (JP)

( * ) Notice: Subject to any disclaimer, the term of this patent is extended or adjusted under 35 U.S.C. 154(b) by 0 days.

(21) Appl. No.: 16/217,990

(22) Filed: Dec. 12, 2018

(65) Prior Publication Data

US 2019/0114894 A1 Apr. 18, 2019

Related U.S. Application Data

(63) Continuation-in-part of application No. PCT/JP2016/068278, filed on Jun. 20, 2016.

(51) Int. Cl.
*G08B 21/02* (2006.01)
*H04W 4/029* (2018.01)
(Continued)

(52) U.S. Cl.
CPC ............ *G08B 21/0277* (2013.01); *G01S 5/02* (2013.01); *G08B 25/04* (2013.01); *H04B 7/155* (2013.01); *H04M 11/00* (2013.01); *H04W 4/029* (2018.02)

(58) Field of Classification Search
CPC ....... G01S 5/02; G08B 21/0277; G08B 25/04; H04B 7/155; H04M 11/00; H04W 4/029
See application file for complete search history.

(56) References Cited

U.S. PATENT DOCUMENTS

2012/0295638 A1* 11/2012 Yamauchi ........... H04M 1/7253
455/456.1
2016/0049108 A1* 2/2016 Yajima ................... A63F 13/00
345/212

FOREIGN PATENT DOCUMENTS

JP 2002101908 A 4/2002
JP 2006-194693 A 7/2006
(Continued)

OTHER PUBLICATIONS

English Translation of the Written Opinion of the International Searching Authority for PCT/JP2016/068278, dated Aug. 11, 2018 (Year: 2018).*

(Continued)

*Primary Examiner* — Nadar Bolourchi
(74) *Attorney, Agent, or Firm* — Blank Rome LLP

(57) ABSTRACT

A position management system 1 includes an identification information transmitting apparatus 10, a relay mobile terminal 20, and a management apparatus 30, wherein the identification information transmitting apparatus 10 includes a power generating unit 12, an identification side storage unit 13, and an identification side transmitting unit 14 that wirelessly transmits an identification side signal using the electric power generated by the power generating unit 12, wherein the relay mobile terminal 20 includes a terminal side communication unit 21 and a terminal side communication unit 21 that wirelessly transmits a relay side signal, and wherein the management apparatus 30 includes a management side communication unit 31 and a management side control unit 33 that is based on the relay side signal received by the management side communication unit 31.

9 Claims, 7 Drawing Sheets

(51) Int. Cl.
    *G01S 5/02*    (2010.01)
    *H04M 11/00*   (2006.01)
    *G08B 25/04*   (2006.01)
    *H04B 7/155*   (2006.01)

(56) References Cited

FOREIGN PATENT DOCUMENTS

| | | |
|---|---|---|
| JP | 2011-154571 A | 8/2011 |
| JP | 2014-093005 A | 5/2014 |
| JP | 2017181469 A | 10/2017 |

OTHER PUBLICATIONS

English Translation of International Preliminary Report on Patentability Chapter I (IB/373) for PCT/JP2016/068278, dated Dec. 25, 2018 (Year: 2018).*

* cited by examiner

[MOVER TABLE]

| MOVER IDENTIFICATION INFORMATION | HIGH FREQUENCY SIDE TRANSMITTING APPARATUS IDENTIFICATION INFORMATION | LOW FREQUENCY SIDE TRANSMITTING APPARATUS IDENTIFICATION INFORMATION | MOVEMENT RANGE INFORMATION | STATE INFORMATION |
|---|---|---|---|---|
| AAAA | IDAl1 | IDAr1 | (X11, Y11), (X12, Y12), ··· | NORMAL |
| BBBB | IDAl2 | IDAr2 | (X21, Y21), (X22, Y22), ··· | ABNORMAL |
| CCCC | IDAl3 | IDAr3 | (X31, Y31), (X32, Y32), ··· | SEARCH |
| ··· | ··· | ··· | ··· | ··· |

FIG. 5

[POSITION INFORMATION TABLE]

| MOVER IDENTIFICATION INFORMATION | TRANSMITTING APPARATUS IDENTIFICATION INFORMATION | RECEPTION DATE AND TIME INFORMATION | CURRENT POSITION SPECIFYING INFORMATION |
|---|---|---|---|
| AAAA | IDAr1 | 20150202130000 | X41, Y41 |
| AAAA | IDAr1 | 20150202131000 | X41, Y42 |
| AAAA | IDAr1 | 20150202132000 | X41, Y43 |
| AAAA | IDAi1 | 20150202132002 | X41, Y51 |
| AAAA | IDAi1 | 20150202130004 | X41, Y52 |
| AAAA | IDAi1 | 20150202130006 | X41, Y53 |
| AAAA | IDAi1 | 20150202130008 | X41, Y54 |
| AAAA | IDAi1 | 20150202130010 | X41, Y55 |
| ... | ... | ... | ... |
| BBBB | ... | ... | ... |
| CCCC | ... | ... | ... |
| ... | ... | ... | ... |

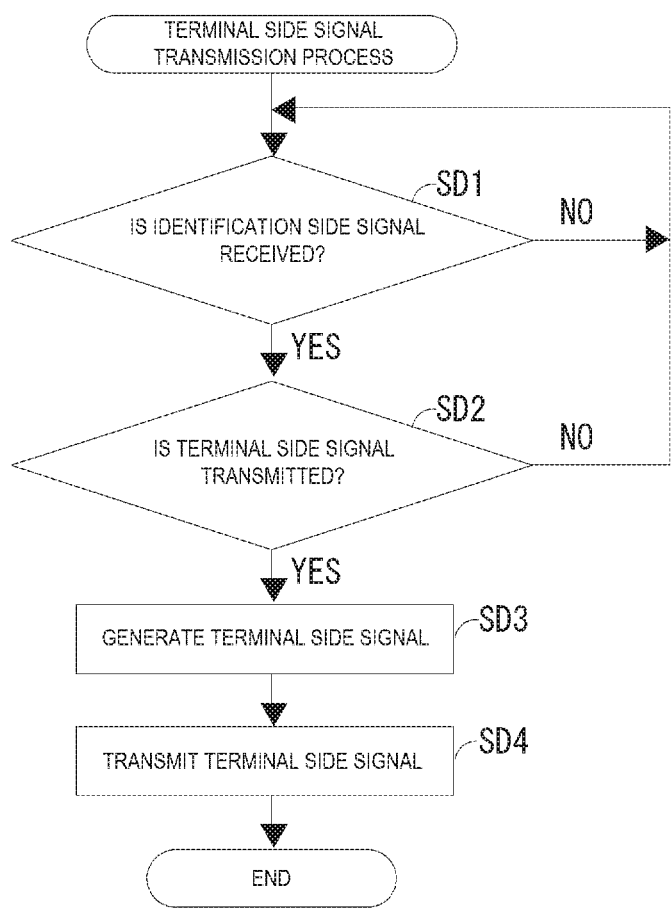

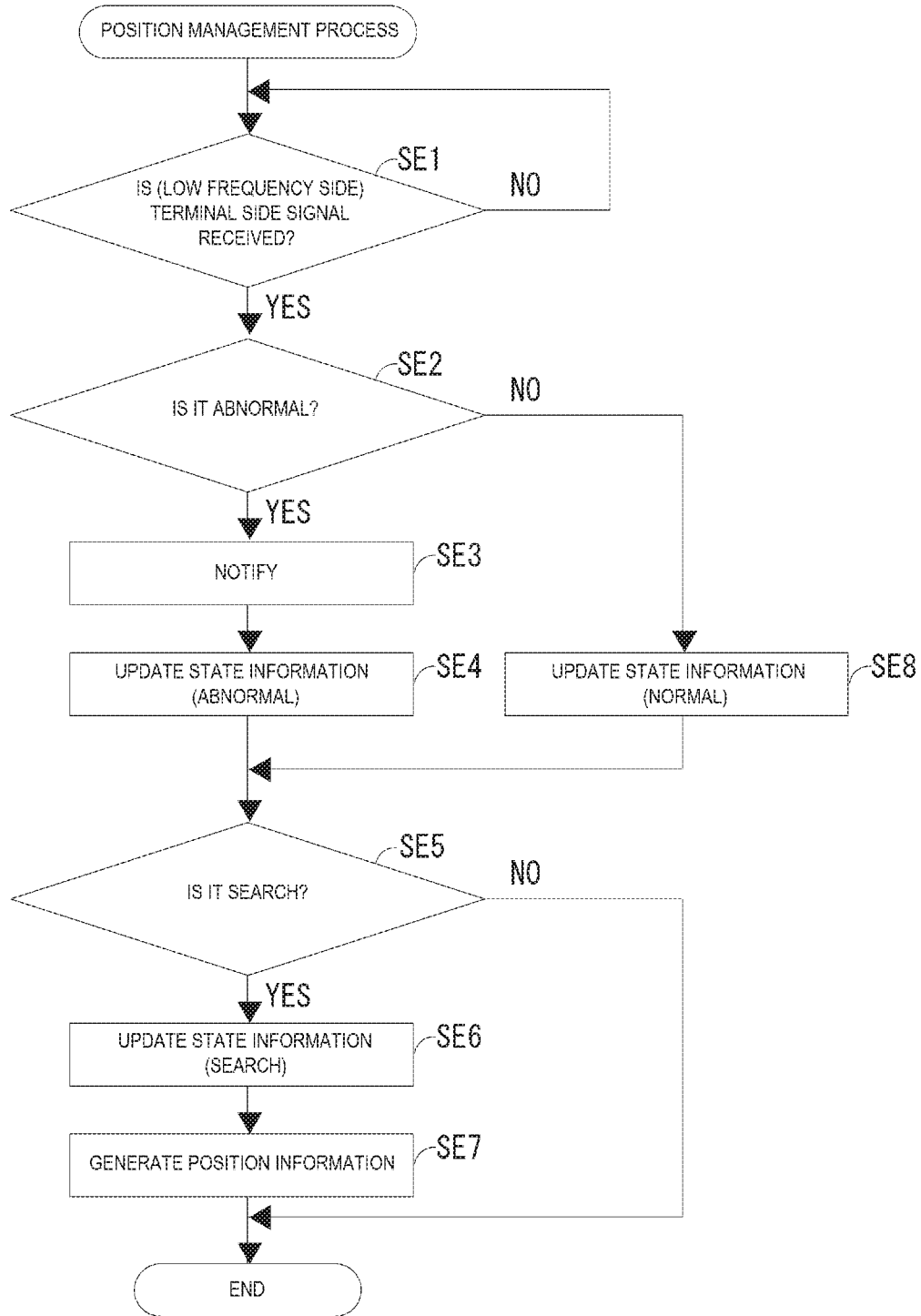

CONTROL SYSTEM

CROSS-REFERENCE TO RELATED APPLICATIONS

This application is a continuation-in-part of International Patent Application No. PCT/JP2016/068278, filed Jun. 20, 2016, which is incorporated by reference herein in its entirety for all purposes.

TECHNICAL FIELD

The present invention relates to a control system.

BACKGROUND ART

In the past, a control system which directly or indirectly receives a wireless signal from a mobile terminal carried by a mover who is a moving person and performs control for the mover on the basis of the received wireless signal has been known. For example, a position management system that generates a wireless signal including position information and identification information of a mobile terminal carried by a mover, periodically transmits the generated wireless signal to a server apparatus, and performs control of managing a position of the mover carrying the mobile terminal on the basis of information included in the transmitted wireless signal has been known as the control system (for example, see Patent Document 1).

CITATION LIST

Patent Document

Patent Document 1: JP-A-2011-154571

SUMMARY OF THE INVENTION

Problems to be Solved by Inventions

However, in the system disclosed in Patent Document 1, it is necessary to use an internal battery in the mobile terminal as a power source for driving the mobile terminal so that a movement range of the mover carrying the mobile terminal is not limited instead of a commercial power source which needs to be wired to an outlet. Further, when the battery is used as the power source for driving the mobile terminal, since a period time in which the mobile terminal can be used continuously is limited depending on a battery capacity, and it is necessary to complete charging in advance before the mover goes out, there is room for improvement in a viewpoint of performing control for the mover continuously and stably.

The invention was made in light of the above problems, and it is an object of the invention to provide a control system capable of performing control for the mover continuously and stably.

Solutions to Solve Problems

In order to solve the aforementioned problem and to achieve the object, one aspect of the invention provides a control system, comprises: an identification information transmitting apparatus; a relay apparatus; and a control apparatus, wherein the identification information transmitting apparatus is carried by a mover and includes a power generating unit that generates electric power using environmental energy, an identification side storage unit that stores transmitting apparatus identification information uniquely identifying the identification information transmitting apparatus, and an identification side transmitting unit that wirelessly transmits an identification side signal including the transmitting apparatus identification information stored in the identification side storage unit using the electric power generated by the power generating unit when a transmission condition is satisfied, the relay apparatus includes a relay side receiving unit that receives the identification side signal transmitted from the identification side transmitting unit of the identification information transmitting apparatus, and a relay side transmitting unit that wirelessly transmits a relay side signal which is a signal including at least the transmitting apparatus identification information included in the identification side signal received by the relay side receiving unit, and the control apparatus includes a control side receiving unit that receives the relay side signal transmitted from the relay side transmitting unit of the relay apparatus, and a control side control unit that performs control for the mover on the basis of the relay side signal received by the control side receiving unit.

BRIEF DESCRIPTION OF THE DRAWINGS

FIG. 5 is a diagram illustrating a configuration example of a position information table.

FIG. 8 is a flowchart of a terminal side signal transmission process.

FIG. 9 is a flowchart of a position management process.

MODE FOR CARRYING OUT THE INVENTION

Figure 1:
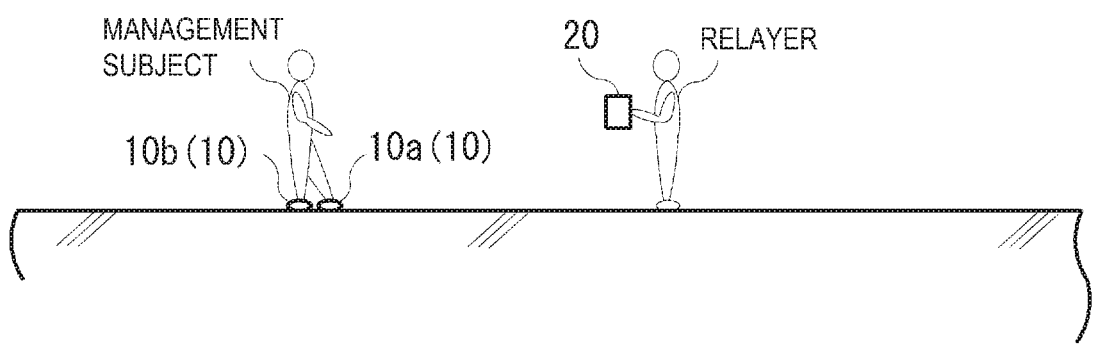
FIG. 1 is a side view illustrating an installation situation of a position management system according to an embodiment.

Hereinafter, an exemplary embodiment of a control system according to the invention will be described in detail with reference to the appended drawings. However, the invention is not limited by an embodiment.

A control system according to the invention is a system that includes an identification information transmitting apparatus, a relay apparatus, and a control apparatus and performs control for a mover.

Here, a "mover" is a moving person or a moving object, and includes, specifically, a concept including both a human and an animal, a concept including, for example, a child, a youth, a middle age, an elderly person which are humans, and a dog and a cat which are animals, and a concept including an automobile, a bike, a bicycle, a wheelchair, and the like which are vehicles. Further, "control for a mover" is control related to a mover, and is specifically, control of managing a position of a mover in order to search for a mover.

An "identification information transmitting apparatus" is an apparatus that transmits an identification side signal wirelessly, specifically, an apparatus capable of performing wirelessly communication with a relay apparatus and an apparatus carried by a mover. A specific configuration of the identification information transmitting apparatus is arbitrary, and for example, a function of transmitting an identification side signal may be added to a well-known general-purpose information apparatus, or it may be configured as a dedicated apparatus that transmits an identification side signal. In particular, the identification information transmitting apparatus is configured to transmit identification information using electric power generated using environmental energy, and thus the identification information transmitting apparatus can be installed in a place in which it is difficult to use commercial power or can be installed without concerning about a problem related to a battery capacity. An "identification side signal" is a wireless signal transmitted by the identification information transmitting apparatus, specifically, a signal that includes at least transmitting apparatus identification information uniquely identifying the identification information transmitting apparatus. "Environmental energy" means energy existing in various forms in the environment, and is a concept including, for example, light, heat, pressure (including hydraulic power and wave force), a sound, vibration, a radio wave, and the like. Any electric power obtained by power generation using the environmental energy (energy harvesting) can be used regardless of a type or a principle thereof. The following description will proceed with an example in which the environmental energy is used, and a power generating unit is configured as a "shoe-mounted power generating unit" in which a power generating unit performs power generation using pressure occurring when a mover steps on the power generating unit directly or indirectly while carrying it.

A "relay apparatus" is an apparatus that relays signals, specifically, an apparatus that receives an identification side signal wirelessly transmitted from the identification information transmitting apparatus and transmits a relay side signal wirelessly, and is a concept including, for example, a relay mobile terminal and a receiving apparatus. A "relay side signal" is a wireless signal transmitted by the relay apparatus, specifically, a signal including at least the transmitting apparatus identification information. A "relay mobile terminal" is a movable information terminal which is carried by a relayer to be described later other than a mover and is a concept including, for example, a mobile phone terminal including a smartphone, a tablet computer, a personal digital assistant (PDA), a wearable device such as a glasses type computer or a wristwatch type computer, and a car navigation apparatus installed in a vehicle. A "receiving apparatus" is an apparatus which is fixedly installed at a predetermined spot and may be an apparatus in which a signal relay function is added to a general-purpose information apparatus such as a known wireless LAN router or a wireless access point or may be configured as a dedicated apparatus that relays signals.

A "control apparatus" is an apparatus that performs control for a mover, specifically, an apparatus that receives a relay side signal wirelessly transmitted from a relay apparatus and performs control for a mover on the basis of the received relay side signal, and is a concept including, for example, a management apparatus or the like. A "management apparatus" is an apparatus that performs control for managing a position of a mover in order to search for a mover and may be, for example, an apparatus in which a management a management function for managing a position of a mover is added to a known general information server apparatus or may be configured as a dedicated apparatus that manages a position of a mover.

Further, in the present embodiment, an example in which control for managing a position of a mover is performed in order to search for a mover will be described. Specifically, an example in which a "mover" is a management subject, for example, an "elderly person" who is likely to suffer from dementia and wander, the "identification information transmitting apparatus" is an apparatus which is installed on each of a pair of left and right shoes worn by a mover (that is, a right-foot shoe and a left-foot shoe), the "relay apparatus" is the "relay mobile terminal" of a relayer, and the "control apparatus" is the "management apparatus." Here, a "relayer" is a person who relays signals, specifically, a person who carries a relay mobile terminal and is a concept including a human and an animal, but the description will proceed with an example in which the "relayer" is a human. Further, a correspondence relation of the identification information transmitting apparatus, the relay mobile terminal, and the information providing apparatus can be arbitrarily decided, but it is preferable that one device be installed as each device, but the following description will proceed an example in which one mover carries two identification information transmitting apparatuses as described above, and a plurality of relay mobile terminals are installed in association with a single management apparatus.

(Configuration)

Figure 2:
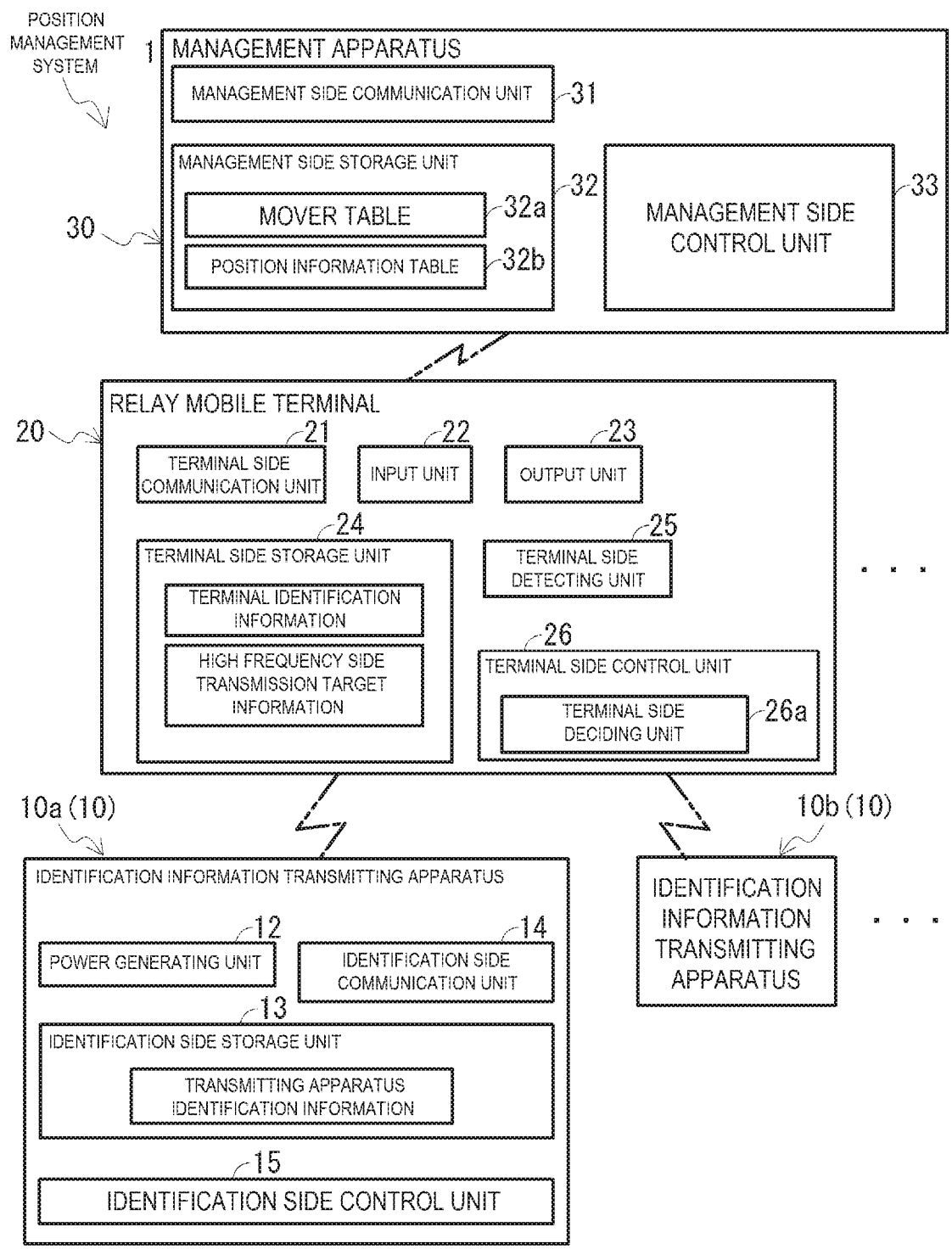
FIG. 2 is a block diagram illustrating a position management system.

First, a configuration of a position management system according to an embodiment will be described. FIG. 1 is a side view illustrating an installation state of the position management system according to the embodiment, and FIG. 2 is a block diagram illustrating the position management system. As illustrated in FIGS. 1 and 2, a position management system 1 is a control system and includes identification information transmitting apparatuses 10a and 10b, a relay mobile terminal 20, and a single management apparatus 30. Regarding the identification information transmitting apparatuses 10a and 10b specifically illustrated in FIGS. 1 and 2, in the position management system 1, actually, there are a plurality of movers, and a plurality of sets of identification information transmitting apparatus 10a and 10b are installed, but the following description will proceed focusing on one mover who carries the identification information transmitting apparatus 10a and 10b specifically illustrated in these FIGS. 1 and 2. Further, when it is unnecessary to distinguish the identification information transmitting apparatuses 10a and 10b from each other, they are referred to collectively as an "identification information transmitting apparatus 10." Further, regarding the relay mobile terminal 20 specifically illustrated in FIGS. 1 and 2, in the position management system 1, actually, there are a plurality of relayers and a plurality of relay mobile terminals 20 are installed, but the following description will proceed focusing on one relayer who carries the relay mobile terminal 20 specifically illustrated in these FIGS. 1 and 2. The identification information transmitting apparatus 10 is carried by the mover, and specifically, the identification information transmitting apparatus 10a is installed in the left-foot shoe and carried, and the identification information transmitting apparatus 10b is installed in the right-foot shoe and carried. The relay mobile terminal 20 is carried by the relayer. The management apparatus 30 is installed in a server room (not illustrated) of an information management center.

(Configuration-Identification Information Transmitting Apparatus)

First, the identification information transmitting apparatus 10 will be described. Since the identification information transmitting apparatus 10a and 10b can be configured similarly except for transmitting apparatus identification information stored therein and some functions, the identification information transmitting apparatus 10a will be mainly described, and the description of the identification information transmitting apparatus 10b will proceed focusing on configurations different from those of the identification information transmitting apparatus 10a.

Figures 3, 4:
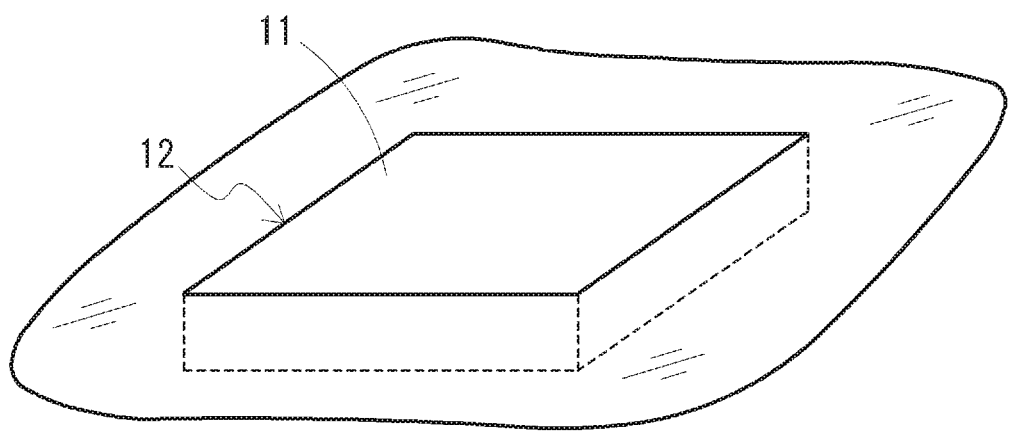
FIG. 3 is a perspective view of an identification information transmitting apparatus of FIG. 1 when viewed obliquely from above.
FIG. 4 is a diagram illustrating a configuration example of a mover table.

(Configuration-identification information transmitting apparatus-left foot) FIG. 3 is a perspective view of the identification information transmitting apparatus 10a of FIG. 1 when viewed obliquely from above. This identification information transmitting apparatus 10a is installed in the left-foot shoe and carried and configured such that a power generating unit 12, an identification side storage unit 13 of FIG. 2, an identification side communication unit 14, and an identification side control unit 15 are accommodated in a housing 11.

(Configuration-Identification Information Transmitting Apparatus-Left Foot-Housing)

The housing 11 of FIG. 3 is installed at the bottom of the shoe worn by the mover so that it is stepped directly or indirectly by the foot of the mover when the mover moves (for example, walks or runs), and receives external force when stepped by the movement and is displaced.

(Configuration-Identification Information Transmitting Apparatus-Left Foot-Power Generating Unit)

The power generating unit 12 is a first power generating unit that generates electric power using the environmental energy, and is particularly configured as a "shoe-mounted power generating unit" in which a power generating unit performs power generation using pressure when the mover directly or indirectly steps on the power generating unit. Further, although a specific configuration of the power generating unit 12 is arbitrary, for example, a power generating unit such as a known piezoelectric element which is a unit (not illustrated), a rectifying unit such as a known bridge circuit, an electricity storage unit such as a known secondary battery or a capacitor, and the like.

(Configuration-Identification Information Transmitting Apparatus-Left Foot-Identification Side Storage Unit)

The identification side storage unit 13 of FIG. 2 is a recording unit that records a program and various kinds of data necessary for an operation of the identification information transmitting apparatus 10a. The identification side storage unit 13 is configured using, for example, a flash memory (not illustrated) serving as an external recording apparatus, but any other arbitrary recording medium can be used instead of or in addition to the flash memory (the same applies to a storage unit of each apparatus to be described later.)

In particular, the identification side storage unit 13 is configured as an identification side storage unit that stores the transmitting apparatus identification information uniquely identifying the identification information transmitting apparatus 10a. Further, this transmitting apparatus identification information is recorded through a predetermined input unit when the identification information transmitting apparatus 10a is manufactured (identification information of each apparatus to be described later is also similarly recorded).

(Configuration-Identification Information Transmitting Apparatus-Left Foot-Identification Side Communication Unit)

The identification side communication unit 14 is a communication unit that performs communication with the relay mobile terminal 20, and is particularly an identification side transmitting unit (a first identification side transmitting unit) that wirelessly transmits an identification side signal (a first identification side signal) including the transmitting apparatus identification information stored in the identification side storage unit 13 using the electric power generated in the power generating unit 12 when a transmission condition (hereinafter, "left-foot transmission condition") (a first transmission condition) is satisfied. Although a specific structure and a communication method of this identification side communication unit 14 are arbitrary, in the present embodiment, the identification side communication unit 14 performs near field communication according to a near field communication standard such as a Bluetooth (registered trademark), iBeacon (registered trademark), a wireless LAN, or Wi-Fi with the relay mobile terminal 20 through a known structure. Here, the "left-foot transmission condition" is a condition that the identification information transmitting apparatus 10a transmits the identification side signal. For example, the left-foot transmission condition may be a condition that the housing 11 of FIG. 3 is stepped once by the mover (single power generation is performed in the power generating unit 12, and the electric power generated by the single power generation is accumulated in an electricity storage unit (not illustrated) of the identification information transmitting apparatus) or may be a condition that the housing 11 of FIG. 3 is stepped on twice or more by the mover (two or more power generations are performed in the power generating unit 12, and the electric power generated by the two or more power generations is accumulated in an electricity storage unit (not illustrated) of the identification information transmitting apparatus). Further, the following description will proceed with an example in which the housing 11 of FIG. 3 is stepped once by the mover (single power generation is performed in the power generating unit 12, and the electric power generated by the single power generation is accumulated in an electricity storage unit (not illustrated) of the identification information transmitting apparatus).

(Configuration-Identification Information Transmitting Apparatus-Left Foot-Identification Side Control Unit)

The identification side control unit 15 in FIG. 2 is a control unit that controls the identification information transmitting apparatus 10a. Specifically, the identification side control unit 15 is a computer including a CPU, various kinds of programs (a basic control program such as an OS and an application program which is activated on the OS and realizes a specific function) which are interpreted and executed on the CPU and an internal memory such as a RAM or a flash memory for storing the programs and various kinds of data or a dedicated semiconductor device configured to perform equivalent functions (the same applies to a control unit of each apparatus to be described later). Respective units of the identification side control unit 15 are configured such that a program for the identification information transmitting apparatus is configured in a manufacturing process or installed via an arbitrary recording medium or a network (the same applies to a control unit of each apparatus to be described later). Processes executed by the respective units of the identification side control unit 15 will be described later in detail.

(Configuration-Identification Information Transmitting Apparatus-Right Foot)

The identification information transmitting apparatus 10b of FIG. 2 is installed and carried in the right-foot shoe of the mover and has a similar configuration to that of the identification information transmitting apparatus 10a except for the transmitting apparatus identification information stored therein and some functions. In the following description, the power generating unit and the respective units of the identification information transmitting apparatus 10b are referred to as a "power generating unit of the identification information transmitting apparatus 10b," an "identification side communication unit of the identification information transmitting apparatus 10b," and the like. In the identification information transmitting apparatus 10b, the identification side storage unit of the identification information transmitting apparatus 10b is an identification side storage unit that stores the transmitting apparatus identification information uniquely identifying the identification information transmitting apparatus 10b. Further, the identification side communication unit of the identification information transmitting apparatus 10b is a communication unit that performs communication with the relay mobile terminal 20, and is particularly a second identification side transmitting unit that wirelessly transmits an identification side signal (a second identification side signal) including the transmitting apparatus identification information stored in the identification side storage unit of the identification information transmitting apparatus 10b using electric power generated by the power generating unit (second power generating unit) of the identification information transmitting apparatus 10b when a transmission condition (hereinafter, "right-foot transmission condition") (a second transmission condition) different from the left-foot transmission condition of the identification information transmitting apparatus 10a is satisfied. Here, the "right-foot transmission condition" is a condition that the identification information transmitting apparatus 10b transmits an identification side signal. For example, the right-foot transmission condition may be a condition that the housing of the identification information transmitting apparatus 10b (having a configuration similar to the housing 11 in FIG. 3) is stepped once by the mover (single power generation is performed in the power generating unit of the identification information transmitting apparatus 10b, and the electric power generated by the single power generation is accumulated in an electricity storage unit (not illustrated) of the identification information transmitting apparatus 10b), a condition that the housing of the identification information transmitting apparatus 10b is stepped twice or more by the mover (two or more power generations are performed in the power generating unit of the identification information transmitting apparatus 10b, and the electric power generated by the two or more power generations is accumulated in an electricity storage unit (not illustrated) of the identification information transmitting apparatus), or a condition that an amount of accumulated electric power reaches a predetermined value. The following description will proceed with an example in which the housing of the identification information transmitting apparatus 10b is stepped twice or more (specifically, 500 times) by the mover (two or more (specifically, 500) power generations are performed in the power generating unit of the identification information transmitting apparatus 10b, and the electric power generated by the two or more power generations is accumulated in an electricity storage unit (not illustrated) of the identification information transmitting apparatus). In other words, the following description will proceed with an example in which the identification side communication unit 14 of the identification information transmitting apparatus 10a and the identification side communication unit of the identification information transmitting apparatus 10b are configured to transmit the identification side signals at different frequencies with different strengths.

(Configuration-Relay Mobile Terminal)

Next, the relay mobile terminal 20 will be described. Since a plurality of relay mobile terminals 20 can have similar configurations except for information stored therein, the following description of the configuration will proceed with one relay mobile terminal 20. As illustrated in FIG. 2, the relay mobile terminal 20 is a relay apparatus and includes a terminal side communication unit 21, an input unit 22, an output unit 23, a terminal side storage unit 24, a terminal side detecting unit 25, and a terminal side control unit 26.

(Configuration-Relay Mobile Terminal-Terminal Side Communication Unit)

The terminal side communication unit 21 is a communication unit that performs communication with the identification information transmitting apparatus 10 and the management apparatus 30 and particularly functions as a terminal side receiving unit (a relay side receiving unit) that receives the identification side signal transmitted from the identification side communication unit 14 of the identification information transmitting apparatus 10 and a terminal side transmitting unit (a relay side transmitting unit) that wirelessly transmits the terminal side signal (relay side signal) including at least the transmitting apparatus identification information included in the identification side signal received by the terminal side communication unit 21 and current position specifying information specifying a current position which is a current position of the relay mobile terminal 20 detected by the terminal side detecting unit 25. Although a specific structure and a communication method of the terminal side communication unit 21 are arbitrary, in the present embodiment, the terminal side communication unit 21 performs near field communication according to a near field communication standard such as Bluetooth (registered trademark) with the identification information transmitting apparatus 10 through a known structure or performs wireless communication with the management apparatus 30 via a network such as the Internet using a wide area communication unit such as a 3G packet communication or LTE packet communication or an medium area communication unit such as Wi-Fi or a wireless LAN through a known structure.

(Configuration-Relay Mobile Terminal-Input Unit)

The input unit 22 is an input unit that receives information or an instruction on the relay mobile terminal 20 from the user (that is, the relayer). Although a specific configuration of the input unit 22 is arbitrary, for example, the input unit 22 is configured as a known touch pad that receives various kinds of manual inputs from the user when it is touched with a finger of the user or the like. The touch pad is formed in a transparent or translucent form and is installed to overlap a display surface of a display constituting the output unit 23 to be described later in a front surface of the display and formed as a touch panel. A known touch pad including an operation position detecting unit according to, for example, a resistive film scheme, a capacitive scheme, or the like can be used as the touch pad.

(Configuration-Relay Mobile Terminal-Output Unit)

The output unit 23 is an output unit that outputs information from the relay mobile terminal 20 to the outside (user). Although a specific configuration of the output unit 23 is arbitrary, for example, the output unit 23 is configured as a display and a speaker. A specific configuration of the display is arbitrary, and a flat panel display such as a known liquid crystal display or organic EL display can be used. A specific configuration of the speaker is also arbitrary, and a known dynamic speaker or piezo speaker can be used.

(Configuration-Relay Mobile Terminal-Terminal Side Storage Unit)

The terminal side storage unit 24 is a recording unit that records a program and various kinds of data necessary for an operation of the relay mobile terminal 20 and is particularly configured as a terminal side storage unit that stores terminal identification information uniquely identifying the relay mobile terminal and high frequency side transmission target information.

Here, the "high frequency side transmission target information" is information specifying information to be transmitted from the relay mobile terminal 20 to the management apparatus 30 among high frequency side transmitting apparatus identification information to be described later and is particularly information used as a reference for determining whether or not a terminal side signal including the high frequency side transmitting apparatus identification information is transmitted (that is, information functioning as a flag for transmitting the terminal side signal including the high frequency side transmitting apparatus identification information), and is, for example, information including only the transmitting apparatus identification information to be transmitted. Here, the "high frequency side transmitting apparatus identification information" is information specifying the identification information transmitting apparatus which is higher in the transmission frequency of the identification side signal out of the two identification information transmitting apparatuses carried by the movers and is specifically, the transmitting apparatus identification information of the identification information transmitting apparatus. The high frequency side transmission target information is updated as a transmission target information update process to be described later is executed.

(Configuration-Relay Mobile Terminal-Terminal Side Detecting Unit)

The terminal side detecting unit 25 of FIG. 2 is a terminal side current position detecting unit (a relay side current position detecting unit) that detects a current position (current place) of the relay mobile terminal 20. The terminal side detecting unit 25 includes one or a plurality of functions (none of them is illustrated) among information specifying a current position such as information (a latitude, a longitude, and electric field strength) of a GPS or a plurality of base stations, Wi-Fi access point information, position information marker information belonging to a specific position of iBeacon or the like, position specifying information by image recognition, position information superimposed on a sound including an ultrasonic wave, and position information obtained by optical communication including infrared rays or visible light communication, and position information which can be specified by a minute variation in geomagnetism, and detects the current position (for example, longitude and latitude coordinates or the like) of the relay mobile terminal 20 by a known method.

(Configuration-Relay Mobile Terminal-Terminal Side Control Unit)

The terminal side control unit 26 is a control unit that controls the relay mobile terminal 20. The terminal side control unit 26 functionally conceptually includes a terminal side deciding unit 26a. This terminal side deciding unit 26a is a terminal side deciding unit (a relay side deciding unit) that decides whether or not the terminal side signal is transmitted from the terminal side communication unit 21 on the basis of the identification side signal received by the terminal side communication unit 21. Processes executed by respective units of the terminal side control unit 26 will be described later in detail.

(Configuration-Management Apparatus)

Next, the management apparatus 30 will be described. As illustrated in FIG. 2, the management apparatus 30 is a control apparatus and comprises a management side communication unit 31, a management side storage unit 32, and a management side control unit 33.

(Configuration-Management Management-Management Side Communication Unit)

The management side communication unit 31 is a communication unit that performs communication with the relay mobile terminal 20, and is particularly a management side receiving unit (control side receiving unit) that receives the terminal side signal transmitted from the terminal side communication unit 21 of the relay mobile terminal 20. Although a specific structure and a communication method of the management side communication unit 31 are arbitrary, in the present embodiment, the management side communication unit 31 performs communication with the relay mobile terminal 20 via a network such as the Internet through a known structure.

(Configuration-Management Apparatus-Management Side Storage Unit)

The management side storage unit 32 is a recording unit that records a program and various kinds of data necessary for an operation of the management apparatus 30 and is particularly a management side storage unit that stores a mover table 32a and a position information table 32b.

Here, the "mover table" 32a is information for the mover and is specifically information specifying the identification information transmitting apparatus 10 carried by the mover, a predetermined movement range serving as a movement range which is a range in which the mover is scheduled to move, and a current state of the mover. FIG. 4 is a diagram illustrating a configuration example of the mover table 32a. The mover table 32a includes an item "mover identification information," an item "high frequency side transmitting apparatus identification information," an item "low frequency side transmitting apparatus identification information," an item "movement range information," and an item "state information," and is configured such that the information corresponding to the respective items are associated with each other. Information corresponding to the item "mover identification information" is mover identification information (a mover ID is "AAAA" or the like in FIG. 4) identifying a mover which is a management subject in the position management system 1 of FIG. 2. Further, information corresponding to the item "high frequency side transmitting apparatus information" is the high frequency side transmitting apparatus identification information (the "transmitting apparatus identification information" such as "IDA11" in FIG. 4). Further, "IDA11" is the transmitting apparatus identification information of the identification information transmitting apparatus 10a of FIG. 2, "IDA12" and "IDA13" indicate transmitting apparatus identification information of the identification information transmitting apparatuses (not illustrated), and "1" in the information is an identifier identifying that it is the high frequency side transmitting apparatus information itself which will be described below. Further, information corresponding to the item "low frequency side transmitting apparatus identification information" of FIG. 4 is low frequency side transmitting apparatus information (the "transmitting apparatus identification information" such as "IDAr1" or the like in FIG. 4) specifying the identification information transmitting apparatus which is lower in the transmission frequency of the identification side signal out of the two identification information transmitting apparatuses carried by the movers.

Further, "IDAr1" is the transmitting apparatus identification information of the identification information transmitting apparatus 10b of FIG. 2, "IDAr2" and "IDAr3" indicate transmitting apparatus identification information of identification information transmitting apparatuses (not illustrated), and "r" in the information is an identifier identifying that it is the low frequency side transmitting apparatus information itself which will be described below. Further, information corresponding to the item "movement range information" of FIG. 4 is movement range information specifying a predetermined movement range serving as a movement range (that is, geo-fence) which is a range in which the mover is scheduled to move (in FIG. 4, when the movement range is defined as a polygon, it is a set of coordinates of longitude and latitude corresponding to vertexes of the polygon such as a set of "(X11, Y11), (X12, Y12), . . . " or the like). Further, information corresponding to the item "state information" is state information specifying a current state of the mover ("normal," "abnormal," and "search" in FIG. 4). Further, "normal" corresponds to a state in which the mover is conducting ordinary activities and specifically corresponds to a state in which the mover is within the movement range, and a position information acquisition request for the mover is not made. Here, the "position information acquisition request" is a request for acquiring the position information of the mover and is specifically a request which is made from a guardian (for example, a family member) of the mover, is transmitted to the management apparatus 30 of FIG. 2 via a mobile terminal (not illustrated) or the like of the guardian, and includes, for example, the mover identification information of the mover to be searched for. "Abnormal" in FIG. 4 corresponds to a state in which the mover is conducting activities other than ordinary activities and specifically corresponds to a state in which the mover moves out of the movement range, and the position information acquisition request for the mover is not made. "Search" corresponds to a state in which the mover is being searched for and specifically corresponds to a state in which the position information acquisition request for the mover is made. Further, the mover table 32a is input from the relay mobile terminal 20 in FIG. 2 or an arbitrary apparatus including an information terminal apparatus including an input unit which is connected to a network used by a search requestor (for example, a family member of the mover) side such as a personal computer (not illustrated), transmitted to and recorded in the management apparatus 30, and updated as a position management process to be described later is executed.

Further, the "position information table" 32b of FIG. 2 is information for the position of the mover. FIG. 5 is a diagram illustrating a configuration example of the position information table 32b. The position information table 32b includes an item "mover identification information," an item "transmitting apparatus identification information," an item "reception date and time information," and an item "current position specifying information," and the information corresponding to the respective items are configured in association with each other. Information corresponding to the item "mover identification information" is the same information as the information corresponding to the item having the same name in FIG. 4. Further, information corresponding to the item "transmitting apparatus identification information" is transmitting apparatus identification information included in the terminal side signal received by the management side communication unit 31 ("IDAr1," "IDAl1," and the like in FIG. 5). Further, information corresponding to the item "reception date and time information" is reception date and time information specifying a date and time at which the terminal side signal (that is, the transmitting apparatus identification information) is received ("20150202130000" which is a date and time and the like in FIG. 5). Further, "20150202130000" indicates that the date and time at which the terminal side signal is received at 13:00:00 on Feb. 2, 2015. Information corresponding to the item "current position specifying information" is current position specifying information included in the terminal side signal received by the management side communication unit 31 ("X41, Y41" which are coordinates of the longitude and the latitude and the like in FIG. 5). The position information table 32b is recorded as a terminal side signal transmission process to be described later is executed.

(Configuration-Management Apparatus-Management Side Control Unit)

The management side control unit 33 of FIG. 2 is a control unit (a control side control unit) that controls the management apparatus 30. Processes executed by respective units of the management side control unit 33 will be described later in detail.

(Process)

Next, an identification information transmitting apparatus side process, a relay mobile terminal side process, and a management apparatus side process executed by the position management system 1 configured as described above will be described.

(Process-Identification Information Transmitting Apparatus Side Process (Identification Side Signal Transmission Process))

Figure 6:
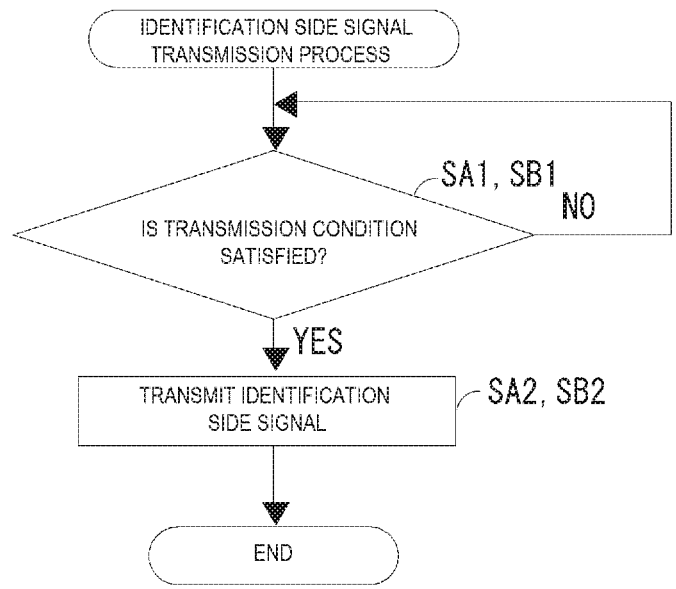
FIG. 6 is a flowchart of an identification side signal transmission process.

First, the identification information transmitting apparatus side process will be described. The identification information transmitting apparatus side process is a process executed by the identification information transmitting apparatus 10 of FIG. 2, specifically, an identification side signal transmission process. FIG. 6 is a flowchart of the identification side signal transmission process (step is abbreviated as "S" in the following description of each process). The "identification side signal transmission process" is a process of transmitting the identification side signal from the identification information transmitting apparatus 10 of FIG. 2 to the relay mobile terminal 20, and is more specifically a process including a "left side identification side signal transmission process" (a process for a symbol "SA" in FIG. 6) which is a process of transmitting the identification side signal from the identification information transmitting apparatus 10a to the relay mobile terminal 20 and a right side identification side signal transmission process (a process for a symbol "SB" in FIG. 6) which is a process of transmitting the identification side signal from the identification information transmitting apparatus 10b to the relay mobile terminal 20. Although a timing to activate the identification side signal transmission process is arbitrary, here, for example, it is assumed that execution of the process is started after the identification information transmitting apparatus 10 of FIG. 2 (that is, itself) is powered on and activated, and it is activated repeatedly each time the process ends, and the description will proceed from a state in which it is activated (the same applies to each process to be described later).

(Process-Identification Side Signal Transmission Process-Left Side Identification Side Signal Transmission Process)

First, as illustrated in FIG. 6, in SA1, the identification side control unit 15 of the identification information transmitting apparatus 10a determines whether or not the transmission condition is satisfied. Specifically, it is determined whether or not the left-foot transmission condition is satisfied. An arbitrary method can be used as a determination method, but the following description will proceed under the assumption that, for example, a detecting unit (not illustrated) (hereinafter referred to as an identification information transmitting apparatus 10a side detecting unit) that detects that the housing 11 of FIG. 3 is stepped on is installed, and a technique of counting the number of detections of "stepping of the housing 11" by the detecting unit and performing the determination is used. Then, when the housing 11 is not stepped on in a state in which the mover is sitting and the power generation is not performed, the transmission condition is determined not to be satisfied because the number of detections of the identification information transmitting apparatus 10a side detecting unit is "0" (NO in SA1), and SA1 is repeatedly executed until it is determined that the transmission condition is satisfied. Further, when the mover starts moving on foot, the housing 11 is stepped on, and the power generating unit 12 performs the power generation, and when the identification information transmitting apparatus 10a side detecting unit detects "single stepping," it is determined that the transmission condition (specifically, the left-foot transmission condition) is satisfied (YES in SA1), and the process proceeds to SA2.

Returning to FIG. 6, in SA2, the identification side control unit 15 of the identification information transmitting apparatus 10a transmits the identification side signal. Specifically, the transmitting apparatus identification information of its own identification side storage unit 13 of FIG. 2 is acquired, the identification side signal including the acquired transmitting apparatus identification information is generated, and the generated identification side signal is wirelessly transmitted to the relay mobile terminal 20 through the identification side communication unit 14 with first strength using the electric power generated by the power generating unit 12 in SA1. Here, the "first strength" is strength of the identification side signal to be wirelessly transmitted and is specifically strength corresponding to the electric power generated by single power generation of the power generating unit 12, and is for example strength at which wireless reception can be performed at a spot 3 to 30 meters away from the identification information transmitting apparatus 10a. In this case, for example, in the case of FIG. 2, "transmitting apparatus identification information of its own identification side storage unit 13"="IDAl1" is acquired, an identification side signal including the acquired "IDAl1" is generated, and the generated identification side signal is wirelessly transmitted to the relay mobile terminal 20 through the identification side communication unit 14 with the first strength using the electric power generated by the power generating unit 12 in SA1. Then, the left side identification side signal transmission process ends.

(Process-Identification Side Signal Transmission Process-Right Side Identification Side Signal Transmission Process)

First, as illustrated in FIG. 6, in SB1, the identification side control unit of the identification information transmitting apparatus 10b determines whether or not the transmission condition is satisfied. Specifically, it is determined whether or not the right-foot transmission condition is satisfied. An arbitrary method can be used as a determination method, but the following description will proceed under the assumption that, for example, a technique similar to that in the determination in SA1 is used, that is, a detecting unit (not illustrated) (hereinafter referred to as an identification information transmitting apparatus 10b side detecting unit) that detects that the housing 11 of the identification information transmitting apparatus 10b is stepped on is installed, and a technique of counting the number of detections of "stepping of the housing of the identification information transmitting apparatus 10b" by the detecting unit and performing the determination is used. Then, when the housing of the identification information transmitting apparatus 10b is not stepped on in a state in which the mover is sitting and the power generation is not performed, the transmission condition is determined not to be satisfied because the number of detections of the identification information transmitting apparatus 10b side detecting unit is "0" (NO in SB1), and SB1 is repeatedly executed until it is determined that the transmission condition is satisfied. Further, when the mover starts moving on foot, the housing of the identification information transmitting apparatus 10b is stepped on, and the power generating unit of the identification information transmitting apparatus 10b performs the power generation, and when the identification information transmitting apparatus 10b side detecting unit detects "500 steppings," it is determined that the transmission condition (specifically, the right-foot transmission condition) is satisfied (YES in SB1), and the process proceeds to SB2.

In SB2, the identification side control unit of the identification information transmitting apparatus 10b transmits the identification side signal. Specifically, the transmitting apparatus identification information of its own identification side storage unit is acquired, the identification side signal including the acquired transmitting apparatus identification information is generated, and the generated identification side signal is wirelessly transmitted to the relay mobile terminal 20 through the identification side communication unit with second strength using the electric power generated by the power generating unit of the identification information transmitting apparatus 10b in SB1. Here, the "second strength" is strength of the identification side signal to be wirelessly transmitted which is stronger than the "first strength" and is specifically strength corresponding to the electric power generated by 500 power generations of the power generating unit of the identification information transmitting apparatus 10b, and is for example strength at which wireless reception can be performed at a spot 100 to 300 meters away from the identification information transmitting apparatus 10b. In this case, for example, in the case of FIG. 2, "transmitting apparatus identification information of its own identification side storage unit 13"="IDAr1" is acquired, an identification side signal including the acquired "IDAr1" is generated, and the generated identification side signal is wirelessly transmitted to the relay mobile terminal 20 through the identification side communication unit of the identification information transmitting apparatus 10b with the second strength using the electric power generated by the power generating unit of the identification information transmitting apparatus 10b in SB1. Then, the right side identification side signal transmission process ends.

(Process-Relay Mobile Terminal Side Process)

Next, the relay mobile terminal side process will be described. The mobile terminal side process is a process executed by the relay mobile terminal 20 of FIG. 2, and specifically includes the transmission target information update process and the terminal side signal transmission process.

(Process-Relay Mobile Terminal Side Process-Transmission Target Information Update Process)

Figure 7:
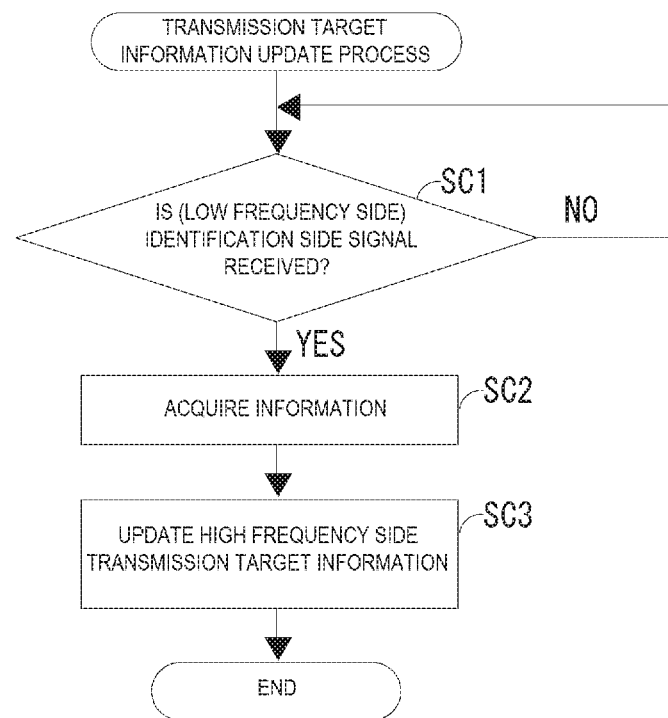
FIG. 7 is a flowchart of a transmission target information update process.

First, the transmission target information update process will be described. FIG. 7 is a flowchart of the transmission target information update process. The "transmission target information update process" is a process of updating the high frequency side transmission target information of the terminal side storage unit 24 of the relay mobile terminal 20 of FIG. 2.

First, as illustrated in FIG. 7, in SC1, the terminal side control unit 26 of the relay mobile terminal 20 determines whether or not the identification side signal including the low frequency side transmitting apparatus identification information is received. Specifically, the transmitting apparatus identification information is acquired from the identification side signal received through the terminal side communication unit 21 of FIG. 2, the identifier of the acquired transmitting apparatus identification information is specified, and it is determined on the basis of whether or not the specified identifier is "r" indicating the low frequency. Then, when the identification side signal is not received or when the identifier included in the received identification side signal is not "r," it is determined that the identification side signal including the low frequency side transmitting apparatus identification information is not received (NO in SC1), and SC1 is repeatedly executed until it is determined that the identification side signal including the low frequency side transmitting apparatus identification information is received. Further, when the identifier included in the received identification side signal is "r," it is determined that the identification side signal including the low frequency side transmitting apparatus identification information is received (YES in SC1), and the process proceeds to SC2. Here, for example, when the identification side signal including "IDAl1" is received, it is determined that the identification side signal including the low frequency side transmitting apparatus identification information is not received, and when the identification side signal including "IDAr1" is received, it is determined that the identification side signal including the low frequency side transmitting apparatus identification information is received.

Returning to FIG. 7, in SC2, the terminal side deciding unit 26a of the relay mobile terminal 20 acquires information. Specifically, the mover table 32a of the management side storage unit 32 of the management apparatus 30 is accessed through the terminal side communication unit 21 of FIG. 2, and the state information and the high frequency side transmitting apparatus identification information of FIG. 4 are acquired as information associated with the transmitting apparatus identification information of the identification side signal received in SC of FIG. 7 in the accessed mover table 32a. Here, for example, when the identification side signal including "IDAr1" is received in SC1, "ordinary" and "IDAl1" of FIG. 4 are acquired. Here, the information (the state information and the high frequency side transmitting apparatus identification information) which the terminal side deciding unit 26a accesses the management apparatus 30 and acquires (receives) from the management apparatus 30 corresponds to "movement information which is information related to movement of the mover," and information including the state information and the high frequency side transmitting apparatus identification information which are information signals which the relay mobile terminal 20 side receives from the management apparatus 30 side in accordance with the access corresponds to a "movement signal (a first movement signal)."

Returning to FIG. 7, in SC3, the terminal side deciding unit 26a of the relay mobile terminal 20 updates the high frequency side transmission target information. Specifically, the high frequency side transmission target information of the terminal side storage unit 24 in FIG. 2 is updated on the basis of the information acquired in SC2. Specifically, when the state information of FIG. 4 acquired in SC2 is "normal,"  it is updated such that the high frequency side transmitting apparatus identification information acquired in SC2 is not included in the high frequency side transmission target information of the terminal side storage unit 24 of FIG. 2, and when the state information of FIG. 4 acquired in SC2 is "abnormal" or "search," it is updated such that the high frequency side transmitting apparatus identification information is included in the high frequency side transmission target information of the terminal side storage unit 24 of FIG. 2. Here, for example, in a case in which "normal" and "IDAl1" are acquired in SC2, when "IDAl1" is not included in the high frequency side transmission target information of the terminal side storage unit 24 of FIG. 2, the current state is maintained, whereas when "IDAl1" is already included in the high frequency side transmission target information of the terminal side storage unit 24 of FIG. 2, "IDAl1" included therein is erased. Further, for example, in a case in which "abnormal" and "IDAl2" are acquired in SC2, when "IDAl2" is not included in the high frequency side transmission target information of the terminal side storage unit 24 of FIG. 2, "IDAl2" is newly recorded (included), whereas when "IDAl2" is already included in the high frequency side transmission target information of the terminal side storage unit 24 of FIG. 2, the current state is maintained. Further, when "search" and "IDAl3" are acquired in SC2, a process similar to the process when "abnormality" and "IDAl2" are acquired in SC2 is performed. Then, the transmission target information update process ends.

(Process-Relay Mobile Terminal Side Process-Terminal Side Signal Transmission Process)

Next, the terminal side signal transmission process will be described. FIG. 8 is a flowchart of the terminal side signal transmission process. The "terminal side signal transmission process" is a process of transmitting the terminal side signal from the relay mobile terminal 20 of FIG. 2 to the management apparatus 30.

First, as illustrated in FIG. 8, in SD1, the terminal side control unit 26 of the relay mobile terminal 20 determines whether or not the identification side signal is received. Specifically, the terminal side communication unit 21 is monitored, and it is determined whether or not the identification side signal (the identification side signal including the low frequency side transmitting apparatus identification information or the identification side signal including the high frequency side transmitting apparatus identification information) is received through the terminal side communication unit 21. Then, when the identification side signal is not transmitted in FIG. 6 or when the identification side signal transmitted in SA2 or SB2 of FIG. 6 does not reach the relay mobile terminal 20, the terminal side communication unit 21 does not receive the identification side signal and determines that the identification side signal is not received (NO in SD1), and repeatedly executes SD1 until it is determined that the identification side signal is received. Further, when the identification side signal transmitted in SA2 or SB2 of FIG. 6 reaches the relay mobile terminal 20 and the terminal side communication unit 21 receives the reached identification side signal, it is determined that the identification side signal is received (YES in SD1), the process proceeds to SD2.

Returning to FIG. 8, in SD2, the terminal side deciding unit 26a of the relay mobile terminal 20 determines whether or not the terminal side signal is transmitted. Specifically, it is determined whether or not the terminal side signal is transmitted on the basis of a type of the identification side signal received in SD1 (specifically, the identification side signal including the low frequency side transmitting apparatus identification information or the identification side signal including the high frequency side transmitting apparatus identification information) and the high frequency transmission target information of the terminal side storage unit 24 of FIG. 2. In detail, first, the transmitting apparatus identification information is acquired from the identification side signal received in SD1, the identifier of the acquired transmitting apparatus identification information is specified, and when the specified identifier is "r" indicating the low frequency, it is determined to be the identification side signal including the low frequency side transmitting apparatus identification information, whereas when the specified identifier is "l" indicating the high frequency, it is determined to be the identification side signal including the high frequency side transmitting apparatus identification information (hereinafter, "type determination step"). Then, when it is determined to be the identification side signal including the low frequency side transmitting apparatus identification information in the "type determination step," it is unconditionally determined that the terminal side signal is transmitted regardless of the high frequency transmission target information of the terminal side storage unit 24 (that is, when it is the identification side signal transmitted at the low frequency, it is unconditionally determined that the terminal side signal is transmitted). Further, in a case in which it is determined to be the identification side signal including the high frequency side transmitting apparatus identification information in the "type determining step," the high frequency transmission target information of the terminal side storage unit 24 is referred to, and when the acquired transmitting apparatus identification information is included in the referred high frequency transmission target information, it is determined that the terminal side signal is transmitted, whereas when the acquired transmitting apparatus identification information is not included in the referred high frequency transmission target information, it is determined that the terminal side signal is not transmitted (that is, when it is the identification side signal transmitted at the high frequency, it is determined on the basis of the high frequency transmission target information updated in the transmission target information update process of FIG. 7). Then, when it is determined that the terminal side signal is transmitted (YES in SD2), the process proceeds to SD3, and when it is determined that the terminal side signal is not transmitted (YES in SD2), the process proceeds to SD1.

Here, for example, when the identification side signal including "IDAr1" is received in SD1, it is unconditionally determined that the terminal side signal is transmitted. Further, for example, in a case in which the identification side signal including "IDAl1" is received in SD1, the high frequency side transmission target information of the terminal side storage unit 24 of FIG. 2 is referred to, and when "IDAl1" is included in the referred high frequency side transmission target information, it is determined that the terminal side signal is transmitted, whereas when "IDAl1" is not included in the referred high frequency side transmission target information, it is determined that the terminal side signal is not transmitted.

Returning to FIG. 8, in SD3, the terminal side control unit 26 of the relay mobile terminal 20 generates the terminal side signal. Specifically, a detection result of the terminal side detecting unit 25 is acquired as the current position specifying information, the transmitting apparatus identification information is acquired from the identification side signal received in SD1, and the terminal side signal including the acquired current position specifying information and the transmitting apparatus identification information is generated. Here, for example, when the identification side information including "IDAr1" is received in SD1 of FIG. 8, and "X41, Y41" is acquired as the current position specifying information, the terminal side signal including "IDAr1" and "X41, Y41" is generated.

Then, in SD4, the terminal side control unit 26 of the relay mobile terminal 20 transmits the terminal side signal. Specifically, the terminal side signal generated in SD3 is wirelessly transmitted to the management apparatus 30 through the terminal side communication unit 21. Here, for example, the terminal side signal including "IDAr1" and "X41, Y41" is wirelessly transmitted to the management apparatus 30 through the terminal side communication unit 21. Then, the terminal side signal transmission process ends.

On the other hand, the management control unit 33 of the management apparatus 30 of FIG. 2 receives the terminal side signal transmitted in SD4 of FIG. 8 via the management side communication unit 31 and the network, and at least some pieces of information of the position information table 32b is updated (recorded) on the basis of the received terminal side signal. Specifically, the transmitting apparatus identification information and the current position specifying information are acquired from the terminal side signal received through the management side communication unit 31, a date and time at which the terminal side signal is received on the basis of a time measurement result of a timepiece unit (not illustrated), the mover identification information corresponding to the acquired transmitting apparatus identification information in FIG. 4 is specified, and the specified mover identification information, the acquired transmitting apparatus identification information, reception date and time information specifying the specified date and time, and the acquired current position specifying information are recorded in association with one another. Here, for example, "transmitting apparatus identification information"="IDAr1" and "current position specifying information"="X41, Y41" are acquired from the terminal side signal including "IDAr1" and "X41, Y41" which is the terminal side signal received through the management side communication unit 31, "date and time at which the terminal side signal is received on the basis of the time measurement result of the timepiece (not illustrated"="13:00:00, Feb. 2, 2015" is specified, "AAAA" is specified as the "mover identification information" corresponding to acquired "IDAr1," and information in the uppermost portion of FIG. 5 is recorded.

(Process-Management Apparatus Side Process (Position Management Process))

Next, a management apparatus side process will be described. The management apparatus side process is a process executed by the management apparatus 30 of FIG. 2, specifically, a position management process. FIG. 9 is a flowchart of the position management process. The "position management process" is a process of managing the position of the mover and is specifically a process of updating the mover table 32a (specifically, the state information of FIG. 4) of the management side storage unit 32 and generating position information to be described later.

First, as illustrated of FIG. 9, in SE1, the management side control unit 33 of the management apparatus 30 determines whether or not the terminal side signal including the low frequency side transmitting apparatus identification information is received. Specifically, it is determined, similarly to the determination of the identification side signal in SC1 of FIG. 7. Then, when the terminal side signal is not received or the identifier included in the received terminal side signal is not "r," it is determined that the terminal side signal including the low frequency side transmitting apparatus identification information is not received (NO in SE1), SE1 is repeatedly executed until it is determined that the terminal side signal including the low frequency side transmitting apparatus identification information is received. Further, when the identifier included in the received terminal side signal is "r," it is determined that the terminal side signal including the low frequency side transmitting apparatus identification information is received (YES in SE1), the process proceeds to SE2. Here, for example, when the identification side signal including "IDAl1" is received, it is determined that the terminal side signal including the low frequency side transmitting apparatus identification information is not received, and when the terminal side signal including "IDAr1" is received, it is determined that the terminal side signal including the low frequency side transmitting apparatus identification information is received.

Returning to FIG. 9, in SE2, the management side control unit 33 of the management apparatus 30 determines whether or not the state of the mover corresponding to the terminal side signal received in SE1 is abnormal. Specifically, it is determined whether or not the mover is out of the movement range on the basis of the mover table 32a and the position information table 32b of the management side storage unit 32 of FIG. 2, and it is determined whether or not the state of the mover is abnormal on the basis of the determination result. Specifically, in FIG. 5, the information associated with the same mover identification information is chronologically sorted (for example, from the past to the present) on the basis of the reception date and time information, the movement path of the mover is specified focusing on the current position specifying information, it is determined whether or not the mover is out of the movement range on the basis of whether or not the specified movement path is out of the movement range specified by the corresponding movement range information in FIG. 4, and it is determined whether or not the state of the mover is abnormal on the basis of the determination result. Here, in the process of "determining whether or not the mover is out of the movement range on the basis of whether or not the specified movement path is out of the movement range specified by the corresponding movement range information in FIG. 4, in further detail, since the current position specifying information of FIG. 5 actually indicates the position of the relayer nearby the mover (specifically, a range in which the identification side signal reaches) other than the position of the mover, for example, when the specified movement path is greatly out of the movement range specified by the movement range information of the corresponding mover identification information in FIG. 4 (for example, 500 meters or more), it is determined that the mover is out of the movement range, whereas when the specified movement path is not greatly out of the movement range specified by the movement range information of the corresponding mover identification information in FIG. 4 (for example, 500 meters or more), it is determined that the mover is not out of the movement range. Then, when it is determined that the mover is out of the movement range, it is determined that the state of the mover is abnormal (YES in SE2), and the process proceeds to SE3. Further, when it is determined that the mover is not out of the movement range, it is determined that the state of the mover is not abnormal (that is, it is determined that the state of the mover is normal) (NO in SE2), and the process proceeds to SE8.

Returning to FIG. 9, in SE3, the management side control unit 33 of the management apparatus 30 gives a notification indicating that the state of the mover determined to be abnormal in SE2 is abnormal. Here, a notification method is arbitrary, but for example, the mover identification information of FIG. 4 may be registered in association with a contact (for example, an e-mail address of the mobile terminal (not illustrated) of a guardian) of a guardian of the mover specified by the mover identification information, and in order to give a notification indicating that a mover whose mover identification information of FIG. 4 is "BBBB" is abnormal, notification indication such as a notification message such as "Mr. OOOO is likely to wander. Please check immediately." may be transmitted to the contact of the guardian through the management side communication unit 31 of FIG. 2. As such a process is performed, the guardian can properly deal with the abnormality of the mover by making the position information acquisition request described above or the like.

Returning to FIG. 9, in SE4, the management side control unit 33 of the management apparatus 30 updates the state information of FIG. 4. Specifically, the state information is updated such that the state information corresponding to the mover determined to be abnormal in SE2 is "abnormal." Here, for example, when it is determined in SE2 that the mover whose mover identification information of FIG. 4 is "BBBB" is abnormal, the state information associated with "BBBB" is updated to "abnormal" as illustrated of FIG. 4.

Returning to FIG. 9, in SE5, the management side control unit 33 of the management apparatus 30 determines whether or not the state of the mover corresponding to the terminal side signal received in SE1 is "search." Specifically, the management side communication unit 31 of FIG. 2 is monitored, and the position information acquisition request (for example, from the mobile terminal (not illustrated) of the guardian) is determined through the management side communication unit 31. Then, when it is determined that there is a position information acquisition request, it is determined that the state of the mover is "search" (YES in SE5), and the process proceeds to SE6. Further, when it is determined that there is no position information acquisition request, it is determined that the state of the mover is not "search" (NO in SE5), and the process ends. Here, for example, when the position information acquisition request including "CCCC" which is the mover identification information of a mover to be searched for is received from a guardian of the mover whose mover identification information of FIG. 4 is "CCCC," it is determined that the state of the mover "CCCC" is "search."

Returning to FIG. 9, in SE6, the management side control unit 33 of the management apparatus 30 updates the state information of FIG. 4. Specifically, the state information is updated such that the state information corresponding to the mover determined to be "search" in SE5 is "search." Here, for example, when it is determined in SE5 that there is a position information acquisition request for the mover whose mover identification information of FIG. 4 is "CCCC," the state information associated with "CCCC" is updated to "search" as illustrated in FIG. 4.

Returning to FIG. 9, in SE7, the management side control unit 33 of the management apparatus 30 generates position information. Specifically, similarly to the process of SE2, the movement path of the mover determined to be "search" in SE5 is specified, and the specified movement path is superimposed on map information to generate the position information of the mover. More specifically, when the current position specifying information is uploaded from a plurality of relay mobile terminals 20 at substantially the same time, an intersecting portion of reception circles thereof (ranges in which it can be assumed that there are identification side signal transmission source centering on the position of the relay mobile terminal 20 from the strength of the identification side signal) is calculated and colored and displayed on a map in a strip form together with time information in which it is estimated that there is a portion with an existence probability. On the other hand, the mobile terminal (not illustrated) of the guardian accesses the management apparatus 30, acquires map information generated by the management side control unit 33 as the position information, and displays the map information on a display unit such as its own liquid crystal display. When the process is performed as described above, the guardian can understand the position of the mover at each time by viewing the display unit of its own mobile terminal.

In SE8 after NO is determined in SE2, the management side control unit 33 of the management apparatus 30 updates the state information of FIG. 4. Specifically, the state information is updated such that the state information corresponding to the mover determined to be abnormal in SE2 is "normal," and then the process proceeds to SE5. Here, for example, when it is determined in SE2 that the mover whose mover identification information of FIG. 4 is "AAAA" is not abnormal, the state information associated with "AAAA" is updated to "normal" as illustrated in FIG. 4. Then, the position management process ends.

Effects of Embodiment

As described above, according to the present embodiment, when the transmission condition is satisfied, the identification side signal including the transmitting apparatus identification information is wirelessly transmitted using the electric power generated by the power generating unit of the identification information transmitting apparatus 10*a* and the power generating unit of the identification information transmitting apparatus 10*b*, and thus, for example, since it is unnecessary to install a battery for supplying the electric power for transmitting the identification side signal in the identification information transmitting apparatus 10, it is possible to perform the control for the mover continuously and stably with no restriction to the battery capacity.

Further, the terminal side signal including the current position specifying information specifying the current position detected by the terminal side detecting unit 25 of the relay mobile terminal 20 is wirelessly transmitted together with the transmitting apparatus identification information included in the identification side signal, and thus, for example, since the relay mobile terminal 20 relays the transmitting apparatus identification information between the identification information transmitting apparatus 10 and the management apparatus 30, it is possible to transfer the transmitting apparatus identification information to the management apparatus 30 reliably, and it is possible to manage the position of the mover reliably.

Further, it is decided whether or not the terminal side signal is transmitted on the basis of the identification side signal, and the transmission side signal is wirelessly transmitted on the basis of a decision result, and thus, for example, since it is possible to adjust the transmission frequency of the terminal side signal, it is possible to reduce the transmission frequency of the terminal side signal, reduce the power consumption of the relay mobile terminal 20, increase the transmission frequency of the terminal side signal, and manage the position of the mover finely.

Further, it is decided whether or not the terminal side signal is transmitted on the basis of the identification side signal and the movement signal, and the terminal side signal is wirelessly transmitted on the basis of a decision result, and thus, for example, since it is possible to adjust the transmission frequency of the terminal side signal while considering information on whether or not the mover is out of the movement range as the movement information of the movement signal, when the mover is not out of the movement range, it is possible to stop the transmission of the terminal side signal on the high frequency side (the left foot in the present embodiment) so that the electric power is not consumed in the relay mobile terminal 20, whereas when the mover is out of the movement range, it is possible to start the transmission of the terminal side signal on the high frequency side (the left foot in the present embodiment) and manage the position of the mover finely.

Further, the power generating unit 12 of the identification information transmitting apparatus 10*a* and the power generating unit of the identification information transmitting apparatus 10*b* are the shoe-mounted power generating units in which power generating unit performs the power generation, and thus, for example, since the power generation is performed when the mover moves using the feet, it is possible to reliably transmit the identification side signal using the generated electric power, and it is possible to manage the position of the mover reliably.

Further, the power generating unit 12 of the identification information transmitting apparatus 10*a* installed in one shoe worn on one foot of the mover and the power generating unit of an identification information transmitting apparatus 10*b* installed in the other shoe worn on the other foot of the mover are provided, and further the identification side communication unit 14 of the identification information transmitting apparatus 10*a* that transmits the identification side signal using the electric power generated by the power generating unit 12 of the identification information transmitting apparatus 10*a* and the identification side communication unit of the identification information transmitting apparatus 10*b* that transmits the identification side signal using the electric power generated by the power generating unit 12 the identification information transmitting apparatus 10*b* are provided, and thus for example, since it is possible to change the operation of the relay apparatus (for example, the transmission side signal is not transmitted when the identification side signal from the identification side communication unit 14 of the identification information transmitting apparatus 10*a* is received, whereas the transmission side signal is transmitted when the identification side signal from the identification side communication unit of the identification information transmitting apparatus 10*b* is received or the like) in accordance with a type of identification side signal received by the relay mobile terminal 20, it is possible to operate the position management system 1 in consideration of the power consumption of the relay mobile terminal 20 and the accuracy of the position management of the mover, and it is possible to improve the convenience of the position management system 1.

Further, the identification side signal from the identification side communication unit 14 of the identification information transmitting apparatus 10*a* and the identification side signal from the identification side communication unit of the identification information transmitting apparatus 10*b* are configured to be transmitted with different strengths, and thus, for example, since it is possible to manage the position of the mover in consideration of the current position of the relay mobile terminal 20 at a position close to the mover and the current position of the relay mobile terminal 20 at a position far from the mover, even when there are few people carrying the relay mobile terminal 20 near the mover, it is possible to detect a rough position, and when there are many people carrying the relay mobile terminal 20 near the mover, it is possible to detect the position with the high position accuracy, and thus it is possible to improve the management accuracy of the position of the mover.

Further, the identification side signal from the identification side communication unit 14 of the identification information transmitting apparatus 10*a* and the identification side signal from the identification side communication unit of the identification information transmitting apparatus 10*b* are configured to be transmitted with different frequencies, and thus, for example, since it is possible to manage the position of the mover finely or roughly, it is possible to appropriately manage the position of the mover in accordance with a management need of the position of the mover.

Modified Example for Embodiment

Although the invention has been described above, the specific structure and units of the invention can be modified and improved arbitrarily within the scope of the technical spirit of the invention as set forth in claims. Hereinafter, modified examples will be described.

Problems to be Solved and Effects of Invention

First, the problems to be solved by the invention and the effects of the invention are not limited to the content described above but may differ depending on the details of an implementation environment or a configuration of the invention, and some of the problems may be solved, or some of the effects may be obtained. For example, although the stability of the control for the mover by the control system according to the invention is almost the same as that in the related art, when the same degree of usefulness as that in the related art is obtained by a structure different from that in the related art, the problems of the invention are solved.

(Distribution and Integration)

Further, each of the above-described electrical components is functionally conceptual and need not be necessarily need to be physically configured as illustrated in the drawings. In other words, a specific form of distribution or integration of respective units is not limited to that illustrated in the drawings, and all or some thereof may be distributed or integrated functionally or physically in arbitrary units depending on various kinds of loads or use situations. A "system" in the present application is not limited to one constituted by a plurality of apparatuses but includes one constituted by a single apparatus. Further, an "apparatus" in the present application is not limited to one constituted by a single apparatus but includes one constituted by a plurality of apparatuses. Further, information stored in the storage unit of each apparatus may be distributed to arbitrary apparatuses, a communication target may be then appropriately changed in each apparatus, and then the process of the embodiment may be performed. For example, after the mover table 32*a* of FIG. 2 is stored in another apparatus (another apparatus) different from the management apparatus 30, in SC2 of FIG. 7, the relay mobile terminal 20 acquires information from another apparatus and perform each process. In other words, the relay mobile terminal 20 may receive the above-described movement signal from another apparatus and perform each process.

(Shape, Numerical Value, Structure, and Time Series)

For the components exemplified in the embodiment and the drawings, shapes, numerical values, or structures or a chronological correlation of a plurality of components can be arbitrarily modified and improved within the scope of the technical spirit of the invention.

(Investigation (1/2))

As the state information of FIG. 4 of the above-described embodiment, investigation" may be employed in addition to "normal," "abnormal," and "search," or instead of at least one of "normal," "abnormal," and "search." "Investigation" corresponds to a state in which the mover is investigated for protection and specifically corresponds to a state in which a protection request for the mover is made. Here, the "protection request" is a request to protect the mover and is specifically a request from the guardian (for example, a family member or the like) of the mover which is transmitted to the management apparatus 30 of FIG. 2 through the mobile terminal (not illustrated) of the guardian or the like and includes, for example, the mover identification information of the mover to be protected.

Then, when "investigation" is employed, the management side control unit 33 of the management apparatus 30 of FIG. 2 determines whether or not the state of the mover is "investigation", similarly to the case of SE5 and SE6, after SE7 of FIG. 9 or any other timing, and updates the state information so that the state information of the FIG. 4 corresponding to the mover whose state is determined to be "investigation" is "investigation" only when the state of the mover is determined to be "investigation."

On the other hand, when the transmission target information update process of FIG. 7 is executed, the relay mobile terminal 20 may perform the following first or second process in addition to or instead of the process of the embodiment.

First, the first process is a process of updating the high frequency side transmission target information. In this first process, the terminal side deciding unit 26*a* of the relay mobile terminal 20 deals with "investigation," similarly to "abnormal" or "search" described in the embodiment in SC3 and performs the process.

Further, the second process is a process of giving an alert. In this second process, when "investigation" is acquired as the state information in the process of SC2, before or after SC3, the terminal side control unit 26 of the relay mobile terminal 20 gives an alert by outputting an alert image or an alert sound for giving a notification indicating that the mover is set as an investigation target through the output unit 23 of FIG. 2. Here, in order to cause the relayer side who is the user of the relay mobile terminal 20 to detect the mover set as the investigation target, feature information (for example, text information or image information of an appearance feature or the like) specifying a feature of the mover specified by the mover identification may be stored in association with the mover identification information of the mover table of FIG. 4, and in SC2, when the relay mobile terminal 20 side accesses the management apparatus side 30, the feature information is acquired as well, and when an alert is given to the relay mobile terminal 20 side, the acquired feature information may be output together with the alert image or the alert sound. Here, the information ("investigation" serving as the state information) which the terminal side control unit 26 accesses the management apparatus 30 and acquires (receives) from the management apparatus corresponds to the "movement information which is information related to the movement of the mover," the information signal which is transmitted from the management apparatus 30 side and received by the relay mobile terminal 20 side in accordance with the accesses and includes the state information corresponds to the "movement signal (a second movement signal)," and a function of the terminal side control unit 26 that outputs an alert when the identification side signal is received in SC1 of FIG. 7, and the second movement signal including the state information of "investigation" is received in SC2 corresponds to a "relay side output unit."

(Investigation (2/2))

Further, in order to give the alert without waiting for access from the relay mobile terminal 20 to the management apparatus 30, the management apparatus 30 may give an alert to the relay mobile terminal 20 side by transmitting the feature information to the relay mobile terminal 20 using an existing push notification method immediately when the protection request is transmitted to the management apparatus 30 of FIG. 2 through the mobile terminal (not illustrated) of the guardian or the like. Further, for example, the protection request may be directly transmitted from the mobile terminal (not illustrated) of the guardian to the relay mobile terminal 20 together with the necessary for giving the alert, and the alert may be given on the relay mobile terminal 20 side. Further, in the alerts of all the variations described above, a contact of the guardian may be output as well. Further, it may be configured so that a setting to permit or prohibit the output of the alert described above is performed in the relay mobile terminal 20 of FIG. 2, and the alert may be output when the setting to permit it is performed, and the alert may not be output when the setting to prohibit it is performed.

(Power Generating Unit)

In the above embodiment, the case in which the power generating unit is configured as the shoe-mounted power generating unit has been described, but the invention is not limited thereto. For example, a power generating unit may be a unit that is installed in a cane held by the mover and configured to perform power generation as the cane comes into contact with the ground or is separated from the ground or may be a unit installed in a wristwatch carried by the mover and configured to perform power generation as the arm is shaken.

(Identification Information Transmitting Apparatus (1/2))

In the above-described embodiment, the case in which the identification information transmitting apparatus 10a is used for the left foot of the mover, and the identification information transmitting apparatus 10b is used for the right foot of the mover has been described, but the invention is not limited thereto. For example, instead, the identification information transmitting apparatus 10a may be used for the right foot of the mover, and the identification information transmitting apparatus 10b may be used for the left foot of the mover.

(Identification Information Transmitting Apparatus (2/2))

In the above-described embodiment, the case in which the left-foot transmission condition and the right-foot transmission condition are different from each other has been described, but the invention is not limited thereto. For example, the same transmission conditions may be used as the left-foot transmission condition and the right-foot transmission condition. With this configuration, the identification side signals are transmitted from the identification information transmitting apparatus 10a and 10b at the same frequency with the same strength.

(Strength of Identification Side Signal)

The strength of the identification side signal transmitted from the identification information transmitting apparatus 10 may be adjusted in accordance with the density of the relay mobile terminals 20 in an area to which the position management system 1 of FIG. 2 according to the above-described embodiment is applied. Specifically, when the density of the relay mobile terminals 20 is low, in order to reliably search for the mover, the strength of the identification side signal may be increased to extend a range in which the identification side signal can reach, and when the density of the relay mobile terminals 20 is high, in order to finely manage the position of the mover, the strength of the identification side signal may be decreased to narrow the range in which the identification side signal can reach.

(Reception Date and Time Information)

For the recording of the reception date and time information of FIG. 5 which is performed after SD4 of FIG. 8 in the above-mentioned embodiment, the relay mobile terminal 20 may include a transmission date and time in the terminal side signal and transmit the resulting terminal side signal in consideration of the occurrence of a deviation between a time at which the relay mobile terminal 20 transmits the terminal side signal in SD4 of FIG. 8 and a time at which the management apparatus 30 receives the terminal side signal, and then the management apparatus 30 side may acquire the transmission date and time included in the terminal side signal and record the acquired transmission date and time in the reception date and time information of FIG. 5.

(Generation of Position Information)

Further, in SE7 of FIG. 9 in the above-described embodiment, the position may be determined with higher accuracy by using, for example, a principle of triangulation. In this case, for example, an electric field strength of the identification side signal received in SD1 of FIG. 8 may be detected, the terminal side signal is generated to include the detected electric field strength in SD3 of FIG. 8, and a process similar to that of the embodiment may be performed. Then, in SE7 of FIG. 9, the position may be determined with higher accuracy by using, for example, a principle of triangulation on the basis of the electric field strength included in the terminal side signal.

(Start of Each Process)

Further, the processes of FIGS. 6 to 9 of the above-described embodiment may be started when a predetermined event occurs (that is, it may be executed in a so-called event-driven manner). Specifically, the left side identification side signal transmission process of FIG. 6 may be started when electric power generated by single power generation is accumulated, and SA2 may be executed after it starts, whereas the right side identification side signal transmission process may be started when electric power generated by 500 power generations are accumulated, and SB2 may be executed after it starts. Further, the process of FIG. 7 may be started when the identification side signal including the low frequency side transmitting apparatus identification information is received, and then SC2 and SC3 may be executed. Further, the process of FIG. 8 may be started when the identification side signal is received, and then SD2 to SD4 may be executed. Further, the process of FIG. 9 may be started when the terminal side signal including the low frequency side transmitting apparatus identification information is received, and then SE2 to SE7 may be executed.

(Relay Apparatus)

In the above-described embodiment, the case in which the relay apparatus is the relay mobile terminal of the relayer has been described, but the invention is not limited thereto. For example, a receiving apparatus fixedly installed in an indoor place or an outdoor building (for example, a building, a utility pole, a signal, a vending machine, or the like) may be used as the relay apparatus, or both the relay mobile terminal and the receiving apparatus may be used as the relay apparatus.

(Features)

Further, the features of the embodiment and the modified examples may be arbitrarily combined.

(Notes)

The notes as some embodiments of the present inventions are described in below.

A control system described in note 1 is a is a control system, comprises: an identification information transmitting apparatus; a relay apparatus; and a control apparatus, wherein the identification information transmitting apparatus is carried by a mover and includes a power generating unit that generates electric power using environmental energy, an identification side storage unit that stores transmitting apparatus identification information uniquely identifying the identification information transmitting apparatus, and an identification side transmitting unit that wirelessly transmits an identification side signal including the transmitting apparatus identification information stored in the identification side storage unit using the electric power generated by the power generating unit when a transmission condition is satisfied, the relay apparatus includes a relay side receiving unit that receives the identification side signal transmitted from the identification side transmitting unit of the identification information transmitting apparatus, and a relay side transmitting unit that wirelessly transmits a relay side signal which is a signal including at least the transmitting apparatus identification information included in the identification side signal received by the relay side receiving unit, and the control apparatus includes a control side receiving unit that receives the relay side signal transmitted from the relay side transmitting unit of the relay apparatus, and a control side control unit that performs control for the mover on the basis of the relay side signal received by the control side receiving unit.

Moreover, the control system described in note 2 is the control system according to note 1, wherein the control system is a system for managing a position of the mover, the relay apparatus includes a relay side current position detecting unit that detects a current position of the relay apparatus, the relay side transmitting unit of the relay apparatus wirelessly transmits the relay side signal including current position specifying information specifying the current position detected by the relay side current position detecting unit together with the transmitting apparatus identification information included in the identification side signal received by the relay side receiving unit, and the control side control unit of the control apparatus manages the position of the mover on the basis of the current position specifying information included in the relay side signal received by the control side receiving unit.

Moreover, the control system described in note 3 is the control system according to note 2, wherein the relay apparatus includes a relay side deciding unit that decides whether or not the relay side signal is transmitted from the relay side transmitting unit of the relay apparatus on the basis of the identification side signal received by the relay side receiving unit, and the relay side transmitting unit of the relay apparatus wirelessly transmits the relay side signal on the basis of a decision result of the relay side deciding unit.

Moreover, the control system described in note 4 is the control system according to note 3, wherein the relay side receiving unit of the relay apparatus receives a movement signal including movement information which is information related to movement of the mover from the control apparatus or another apparatus, and the relay side deciding unit of the relay apparatus decides whether or not the relay side signal is transmitted from the relay side transmitting unit of the relay apparatus on the basis of the identification side signal received by the relay side receiving unit and the movement signal received by the relay side receiving unit.

Moreover, the control system described in note 5 is the control system according to any one of notes 1 to 4, wherein the relay side receiving unit of the relay apparatus receives a movement signal including movement information which is information related to movement of the mover from the control apparatus or another apparatus, and the relay apparatus includes a relay side output unit that outputs an alert when the relay side receiving unit receives the identification side signal, and the relay side receiving unit receives the movement signal.

Moreover, the control system described in note 6 is the control system according to any one of notes 1 to 5, wherein the power generating unit of the identification information transmitting apparatus is installed in a shoe worn by the mover and is a shoe-mounted power generating unit in which the power generating unit performs power generation using pressure occurring when the mover steps on the power generating unit directly or indirectly.

Moreover, the control system described in note 7 is the control system according to note 6, wherein the power generating unit of the identification information transmitting apparatus includes a first power generating unit installed in one shoe worn on one foot of the mover and a second power generating unit installed in the other shoe worn on the other foot of the mover, and the identification side transmitting unit of the identification information transmitting apparatus includes a first identification side transmitting unit that wirelessly transmits a first identification side signal including the transmitting apparatus identification information stored in the identification side storage unit as the identification side signal using electric power generated by the first power generating unit when a first transmission condition is satisfied, and a second identification side transmitting unit that wirelessly transmits a second identification side signal including the transmitting apparatus identification information stored in the identification side storage unit as the identification side signal using electric power generated by the second power generating unit when a second transmission condition is satisfied.

Moreover, the control system described in note 8 is the control system according to note 7, wherein the first identification side transmitting unit and the second identification side transmitting unit are configured such that the first identification side signal transmitted by the first identification side transmitting unit and the second identification side signal transmitted by the second identification side transmitting unit are transmitted with different strengths.

Moreover, the control system described in note 9 is the control system according to note 7 or 8, wherein the first identification side transmitting unit and the second identification side transmitting unit are configured such that the first identification side signal transmitted by the first identification side transmitting unit and the second identification side signal transmitted by the second identification side transmitting unit are transmitted at different frequencies.

Advantageous Effect of Notes

The advantageous effect of notes as advantageous effect of some embodiments of the present inventions are described in below.

According to the control system described in note 1, when the transmission condition is satisfied, the identification side signal including the transmitting apparatus identification information is wirelessly transmitted using the electric power generated by the power generating unit of the identification information transmitting apparatus and the power generating unit of the identification information transmitting apparatus, and thus, for example, since it is unnecessary to install a battery for supplying the electric power for transmitting the identification side signal in the identification information transmitting apparatus, it is possible to perform the control for the mover continuously and stably with no restriction to the battery capacity.

According to the control system described in note 2, the terminal side signal including the current position specifying information specifying the current position detected by the relay side current position detecting unit of the relay apparatus is wirelessly transmitted together with the transmitting apparatus identification information included in the identification side signal, and thus, for example, since the relay apparatus relays the transmitting apparatus identification information between the identification information transmitting apparatus and the control apparatus, it is possible to transfer the transmitting apparatus identification information to the control apparatus reliably, and it is possible to manage the position of the mover reliably.

According to the control system described in note 3, it is decided whether or not the terminal side signal is transmitted on the basis of the identification side signal, and the transmission side signal is wirelessly transmitted on the basis of a decision result, and thus, for example, since it is possible to adjust the transmission frequency of the terminal side signal, it is possible to reduce the transmission frequency of the terminal side signal, reduce the power consumption of the relay apparatus, increase the transmission frequency of the terminal side signal, and manage the position of the mover finely.

According to the control system described in note 4, it is decided whether or not the terminal side signal is transmitted on the basis of the identification side signal and the movement signal, and the terminal side signal is wirelessly transmitted on the basis of a decision result, and thus, for example, since it is possible to adjust the transmission frequency of the terminal side signal while considering information on whether or not the mover is out of the movement range as the movement information of the movement signal, when the mover is not out of the movement range, it is possible to stop the transmission of the terminal side signal so that the electric power is not consumed in the relay apparatus, whereas when the mover is out of the movement range, it is possible to start the transmission of the terminal side signal and manage the position of the mover finely.

According to the control system described in note 5, when the identification side signal is received and the terminal side signal is received, the alarm is output so that, for example, it becomes possible to alert the user of the relay device about the mover and make the user confirm the actual position of the mover.

According to the control system described in note 6, the power generating units are the shoe-mounted power generating units in which the power generating units perform the power generation, and thus, for example, since the power generation is performed when the mover moves using the feet, it is possible to reliably transmit the identification side signal using the generated electric power, and it is possible to manage the position of the mover reliably.

According to the control system described in note 7, the first power generating unit of the identification information transmitting apparatus installed in one shoe worn on one foot of the mover and the second power generating unit of an identification information transmitting apparatus installed in the other shoe worn on the other foot of the mover are provided, and further the first communication unit of the identification information transmitting apparatus that transmits the first identification side signal using the electric power generated by the first power generating unit and the second identification side communication unit that transmits the second identification side signal using the electric power generated by the second power generating unit are provided, and thus for example, since it is possible to change the operation of the relay apparatus (for example, the transmission side signal is not transmitted when the identification side signal from the communication unit of the identification information transmitting apparatus is received, whereas the transmission side signal is transmitted when the identification side signal from the identification side communication unit of the identification information transmitting apparatus is received or the like) in accordance with a type of identification side signal received by the relay apparatus, it is possible to operate the control system in consideration of the power consumption of the relay apparatus and the accuracy of the position management of the mover, and it is possible to improve the convenience of the control system.

According to the control system described in note 8, the first identification side signal and the second identification side signal are configured to be transmitted with different strengths, and thus, for example, since it is possible to manage the position of the mover in consideration of the current position of the relay apparatus at a position close to the mover and the current position of the relay apparatus at a position far from the mover, even when there are few people carrying the relay apparatus near the mover, it is possible to detect a rough position, and when there are many people carrying the relay apparatus near the mover, it is possible to detect the position with the high position accuracy, and thus it is possible to improve the management accuracy of the position of the mover.

According to the control system described in note 9, the first identification side signal and the second identification side signal are configured to be transmitted with different frequencies, and thus, for example, since it is possible to manage the position of the mover finely or roughly, it is possible to appropriately manage the position of the mover in accordance with a management need of the position of the mover.

REFERENCE SIGNS LIST

1 Position management system
10 Identification information transmitting apparatus
10a Identification information transmitting apparatus
10b Identification information transmitting apparatus
11 Housing
12 Power generating unit
13 Identification side storage unit
14 Identification side communication unit
15 Identification side control unit
20 Relay mobile terminal
21 Terminal side communication unit
22 Input unit
23 Output unit
24 Terminal side storage unit
25 Terminal side detecting unit 26 Terminal side control unit
26a Terminal side deciding unit
30 Management apparatus
31 Management side communication unit
32 Management side storage unit
32a Mover table
32b Position information table
33 Management side control unit

The invention claimed is:

1. A control system, comprising:
an identification information transmitting apparatus;
a relay apparatus; and
a control apparatus,
wherein the identification information transmitting apparatus is carried by a mover and includes
a power generating unit that generates electric power using environmental energy,
an identification side storage unit that stores transmitting apparatus identification information uniquely identifying the identification information transmitting apparatus, and
an identification side transmitting unit that wirelessly transmits an identification side signal including the transmitting apparatus identification information stored in the identification side storage unit using the electric power generated by the power generating unit when a transmission condition is satisfied,
the relay apparatus includes
a relay side receiving unit that receives the identification side signal transmitted from the identification side transmitting unit of the identification information transmitting apparatus, and
a relay side transmitting unit that wirelessly transmits a relay side signal which is a signal including at least the transmitting apparatus identification information included in the identification side signal received by the relay side receiving unit, and
the control apparatus includes
a control side receiving unit that receives the relay side signal transmitted from the relay side transmitting unit of the relay apparatus, and
a control side control unit that performs control for the mover on the basis of the relay side signal received by the control side receiving unit.

2. The control system according to claim 1, wherein the control system is a system for managing a position of the mover,
the relay apparatus includes a relay side current position detecting unit that detects a current position of the relay apparatus,
the relay side transmitting unit of the relay apparatus wirelessly transmits the relay side signal including current position specifying information specifying the current position detected by the relay side current position detecting unit together with the transmitting apparatus identification information included in the identification side signal received by the relay side receiving unit, and
the control side control unit of the control apparatus manages the position of the mover on the basis of the current position specifying information included in the relay side signal received by the control side receiving unit.

3. The control system according to claim 2, wherein the relay apparatus includes a relay side deciding unit that decides whether or not the relay side signal is transmitted from the relay side transmitting unit of the relay apparatus on the basis of the identification side signal received by the relay side receiving unit, and
the relay side transmitting unit of the relay apparatus wirelessly transmits the relay side signal on the basis of a decision result of the relay side deciding unit.

4. The control system according to claim 3, wherein the relay side receiving unit of the relay apparatus receives a movement signal including movement information which is information related to movement of the mover from the control apparatus or another apparatus, and
the relay side deciding unit of the relay apparatus decides whether or not the relay side signal is transmitted from the relay side transmitting unit of the relay apparatus on the basis of the identification side signal received by the relay side receiving unit and the movement signal received by the relay side receiving unit.

5. The control system according to claim 1, wherein the relay side receiving unit of the relay apparatus receives a movement signal including movement information which is information related to movement of the mover from the control apparatus or another apparatus, and
the relay apparatus includes a relay side output unit that outputs an alert when the relay side receiving unit receives the identification side signal, and the relay side receiving unit receives the movement signal.

6. The control system according to claim 1, wherein the power generating unit of the identification information transmitting apparatus is installed in a shoe worn by the mover and is a shoe-mounted power generating unit in which the power generating unit performs power generation using pressure occurring when the mover steps on the power generating unit directly or indirectly.

7. The control system according to claim 6, wherein the power generating unit of the identification information transmitting apparatus includes a first power generating unit installed in one shoe worn on one foot of the mover and a second power generating unit installed in the other shoe worn on the other foot of the mover, and
the identification side transmitting unit of the identification information transmitting apparatus includes
a first identification side transmitting unit that wirelessly transmits a first identification side signal including the transmitting apparatus identification information stored in the identification side storage unit as the identification side signal using electric power generated by the first power generating unit when a first transmission condition is satisfied, and
a second identification side transmitting unit that wirelessly transmits a second identification side signal including the transmitting apparatus identification information stored in the identification side storage unit as the identification side signal using electric power generated by the second power generating unit when a second transmission condition is satisfied.

8. The control system according to claim 7, wherein the first identification side transmitting unit and the second identification side transmitting unit are configured such that the first identification side signal transmitted by the first identification side transmitting unit and the second identification side signal transmitted by the second identification side transmitting unit are transmitted with different strengths.

9. The control system according to claim 7, wherein the first identification side transmitting unit and the second identification side transmitting unit are configured such that the first identification side signal transmitted by the first identification side transmitting unit and the second identification side signal transmitted by the second identification side transmitting unit are transmitted at different frequencies.

\* \* \* \* \*